(12) United States Patent
Zucker

(10) Patent No.: US 6,198,706 B1
(45) Date of Patent: *Mar. 6, 2001

(54) OPTICAL FORMAT COMPATIBLE RECORDING AND/OR PLAYBACK DEVICE

(75) Inventor: Friedhelm Zucker, Villingen-Schwenningen (DE)

(73) Assignee: Deutsche Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/522,242

(22) PCT Filed: Mar. 8, 1994

(86) PCT No.: PCT/EP94/00699

§ 371 Date: Nov. 28, 1995

§ 102(e) Date: Nov. 28, 1995

(87) PCT Pub. No.: WO94/22138

PCT Pub. Date: Sep. 29, 1994

(30) Foreign Application Priority Data

Mar. 17, 1993 (DE) ................................. 43 08 531

(51) Int. Cl.[7] ........................................... G11B 7/00
(52) U.S. Cl. ......................................... 369/44.23
(58) Field of Search .......................... 369/44.14, 44.23, 369/112, 54, 13, 44.24, 44.26, 58

(56) References Cited

U.S. PATENT DOCUMENTS 5,381,394 * 1/1995 Yamagawa .................. 369/44.23

FOREIGN PATENT DOCUMENTS

| 0136574 | * | 4/1985 | (EP) . |
| 0465676 | * | 1/1992 | (EP) . |
| 0482964 | * | 4/1992 | (EP) . |
| 0525896 | * | 2/1993 | (EP) . |
| 0558052 | * | 9/1993 | (EP) . |
| 0155077 |   | 9/1995 | (EP) . |
| 0128034 | * | 7/1983 | (JP) . |
| 0139937 | * | 6/1986 | (JP) . |
| 1235032 | * | 9/1989 | (JP) . |

OTHER PUBLICATIONS

Patent Abstracts of Japan, 3–156736 A., P–1260, Oct. 7, 1991, vol. 15, No. 395.
Patent Abstracts of Japan, 3–122823 A., P–1242, Aug. 26, 1991, vol. 15, No. 335.
Patent Abstracts of Japan, 61–248253 A., P–560, Mar. 26, 1987, vol. 11, No. 97.
Patent Abstracts of Japan, 61–158038 A., , P–523, Dec. 4, 1986, vol. 10, No. 361.
German Search Report dated Aug. 17, 1993.

* cited by examiner

*Primary Examiner*—Thang V. Tran
(74) *Attorney, Agent, or Firm*—Joseph S. Tripoli; Paul P. Kiel

(57) ABSTRACT

The invention relates to a method and an arrangement for a compatible recording and/or reproduction device for the reproduction of information from, and/or for recording on, optical information carriers (CD) having differing information storage densities. A light source is used which is adapted to the highest storage density of the information carriers (CD) to be used as regards wavelength and light spot dimensions and the light directed onto the information carrier (CD) is defocused by a defocusing means for the enlargement of the light spot for information carriers (CD) of lower storage density.

6 Claims, 4 Drawing Sheets

OPTICAL FORMAT COMPATIBLE RECORDING AND/OR PLAYBACK DEVICE

BACKGROUND

The invention relates to a method and an arrangement for a compatible recording and/or reproduction device for the reproduction of information from, and/or for recording onto, optical information carriers having differing information storage densities. The compatible recording and/or reproduction device permits the reproduction of information from, and/or recording on, the hitherto conventional optical information carriers in the form of the standardised CD, mini-disc or MOD as well as from, and/or onto, optical information carriers which exhibit a comparatively higher information storage density i.e. lower track separations and smaller elongations of the pits or storage structures.

Items of information are recorded on the CD or compact disc in digital form as depressions, the so-called pits, that follow a spiral track. The track separation of optical information carriers using the present day norm, amounts to 1.6 $\mu$m and the pits have a width of 0.6 $\mu$m and a depth of 0.12 $\mu$m and the length of a pit or the distance between two pits varies in the range between 0.9 and 3.3 $\mu$m, c.f. Philips Tech. Rev, 40, 1982, No. 6, page 156. These standard values are also applicable to the mini-disc. The higher storage capacity of the mini-disc is not attained by a higher storage density of the information carrier but rather, by the compression of the items of information before the recording. The mini-disc corresponds, as regards the construction of the information carrier, to the CD standard values so that the corresponding players do not differ as regards the laser which is used and the scanning device. However, there are, naturally, limits to the amount of data compression that can be effected without loss of information so that one endeavours to increase the storage capacity of the information carrier. This however, necessitates a lower track separation and/or pits having smaller dimensions. As a result, replaying devices of a new type are required which make the optical scanning and the reproduction of information from information carriers of greater storage density possible. For the optical scanning and/or recording of pits of smaller dimensions and having lower track separation, it is necessary to focus the laser beam onto the CD with light spots of smaller dimensions. The dimension of the light spot and also of the numerical aperture of the objective lens as well as of the wavelength of the laser light is thereby determined and thus a smaller light spot diameter or a light spot of smaller dimensions can be achieved by the use of a light source of shorter wavelength. Presently used lasers have a wavelength of 780 nm. However, lasers are already known which produce light having a wavelength of only 680 nm. A quantitative leap is expected from optical frequency doublers, so-called second harmonic generator crystals. They make a halving of the wavelength possible. The power loss thereby arising can be compensated by a higher laser power.

However, the use of a smaller light spot or of a light source of shorter wavelength for the scanning of optical information carriers would lead to information carriers adhering to the present day CD norm not being playable on device of this type. The reason for this, is the principle of destructive interference which is used for the scanning. The principle of destructive interference consists in that an optical scanning of the pits, which are merely formed by depressions in a uniformly reflecting layer, is achieved by focusing the scanning light spot in such a way that the light component reflected from outside a pit is virtually equal to the light component reflected by the depression and thus the light components cancel each other out by destructive interference so that a weakening of the intensity can be evaluated as a scanning signal. There is an interdependence, which is to be maintained, between the dimensions of the pits or of the storage structure and the dimensions of the light spot.

This is also partly applicable to a magneto-optic information carrier, the so-called MOD, in which the storage or reproduction of information is based, in essence, on the rotation of the direction of polarisation. Although the relationship between the dimensions of the magnetic domains and the dimensions of the light spot does not have to be maintained with the degree of accuracy applicable to the pits, a certain interdependence has to be taken into account, even here, for information carriers of differing storage density, especially as regards information carriers having reduced track separation.

Thus, the object of the invention is to develop a recording and/or reproduction device for optical information carriers which is compatible as regards information carriers having differing storage densities despite an interdependence that has to be maintained between the dimensions of the pits or domains and the dimensions of the light spots and which includes a laser emitting light of one wavelength and an objective lens of predetermined focal length.

Although a defocusing of the light beam scanning an optical information carrier, or of writing it in the sense of a recording of information, leads, in known recording and reproduction devices, to a deformation of the light spot reflected onto the photo-detector from the information carrier and this is promptly corrected by means of the focusing control loop, the invention is based, in an advantageous manner, on using a defocusing of the scanning and/or recording beam for a compatible recording and/or reproduction device in order to be able to use optical information carriers of differing generations or of differing storage density in one device. In particular, the endeavour, to increase the quantity of information that is storable on an information carrier, leads to information carriers of greater storage density or to storage structures of lower dimensions. As was already explained, means are known which make it possible to realise CD- and MOD-like information carriers of greater storage density as well as corresponding recording and reproduction device. In this connection, the invention serves, in particular, to overcome the degree of inhibition to the introduction of a generation of devices using information carriers of greater storage density which arises from an assumed incompatibility with the previously used information carriers. A method and an arrangement are specified which permit, in just a single device, the use of information carriers having a storage density corresponding to the present day norm, as well as, of information carriers of greater storage density. This is achieved with a compatible recording and/or reproduction device which is manufactured in such a way that a light source is used, which is adapted to the highest storage density of the information carriers that are to be used as regards wavelength and light spot dimensions, and, the light directed onto the information carrier is defocused by a defocusing means for the enlargement of the light spot when using information carriers of lower storage density. The interdependence which exists between the dimensions of the storage element and the dimensions of the light spot can thereby be maintained even with differently dimensioned storage elements.

In order to have an effect on the beam path in the recording and/or reproduction device in the manner intended, neither a laser producing light of another wavelength nor an objective lens having an altered numerical aperture are used. In accordance with a first embodiment, an effect on the beam path in the recording and/or reproduction device for the defocusing of the light beam directed onto the information carrier is had in that an off-set voltage is used in the focusing control loop as the defocusing means for matching to the storage density of the information carrier. For carrying out the method, an off-set voltage source is provided as the defocusing means in the focusing control loop connected to the photo-detector. Due to the off-set added to the focusing error signal, the objective lens focusing the light beam onto the information carrier is brought, by means of the focusing control loop, into a position which leads to an enlarged light spot on the information carrier and thus can be used for the scanning and/or recording of items of information with an information carrier having a lower storage density. This defocusing is achieved in that the focusing control loop of a recording and or reproduction device guides the objective lens into a position in which a light spot reflected from the information carrier onto the photo-detector is symmetrical with respect to the photo-diodes or photo-segments forming the photo-detector. Since however, an off-set voltage was added to the focusing error signal, this corresponds to a position which deviates from that of focus. A displacement of the working point arising thereby can be counteracted by appropriate dimensioning of the cylindrical lens likewise used in the beam path in known recording and/or reproduction devices. In correspondence with a second embodiment for the manufacture of a compatible recording and/or reproduction device, a means which lengthens the optical path length in the beam path in front of the photo-detector is used as the defocusing means. This may, for example, be a glass plate or a lens. The insertion of a glass plate into the beam path is advantageous vis a vis an altered cylindrical lens for example, since alterations of the position of the cylindrical lens are associated with a displacement of the working point. By having an effect on the beam path in the sense of a lengthening of the optical path length due to the refractive index of the glass plate in the beam path in front of the photo-detector differing from air, a defocusing of the objective lens or enlargement of the light spot suitable for matching to differing information carriers is likewise achieved as a result of the effect of the focusing control loop.

Thus, compatible recording and/or reproduction devices, which are suitable for operation with information carriers of differing storage density, can be manufactured in an advantageous manner.

BRIEF DESCRIPTION OF THE DRAWINGS

The invention will be explained in more detail hereinafter by means of the embodiments in the drawings. Therein

DETAILED DESCRIPTION OF THE PREFERRED EMBODIMENT

Figure 1:
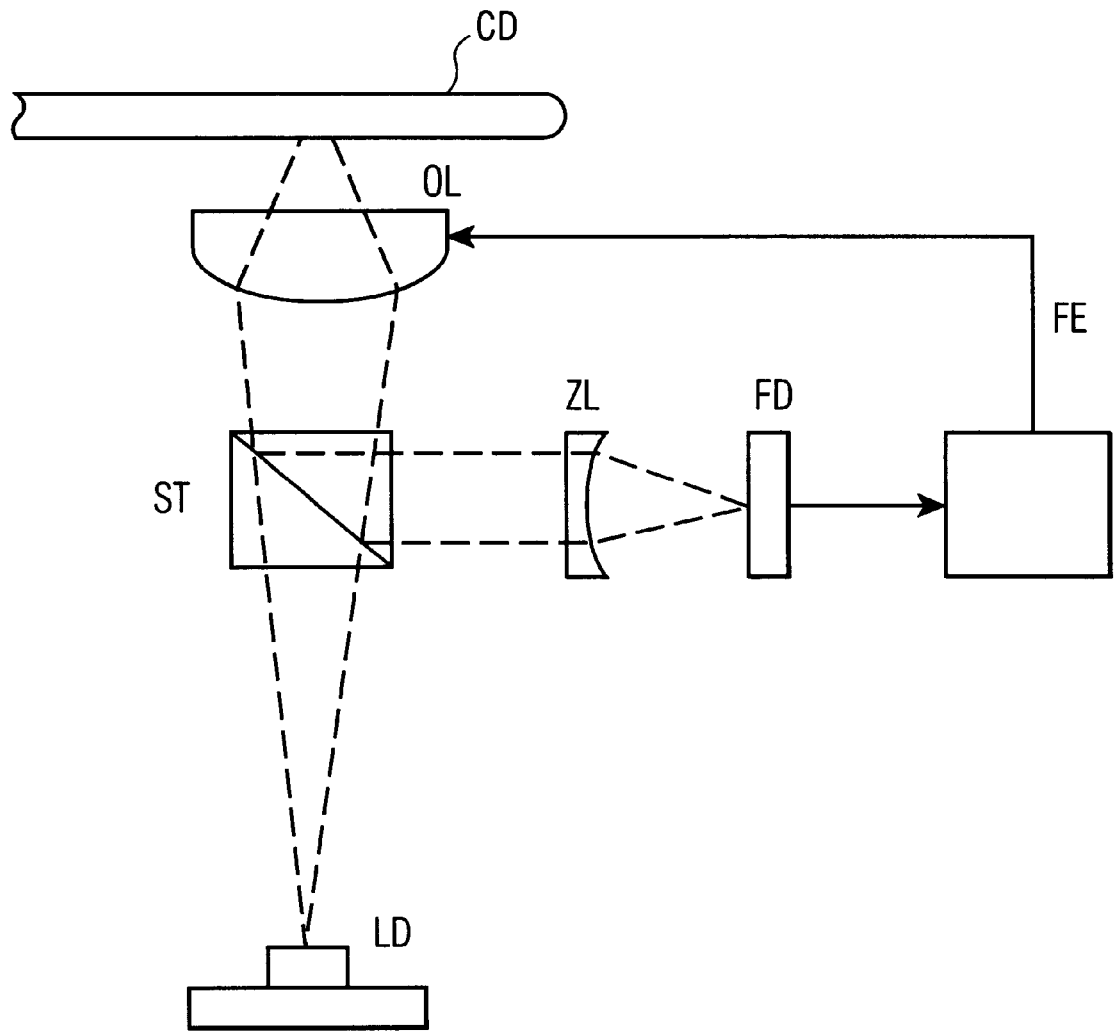
FIG. 1 shows a basic sketch of the elements, which are essential here, of a recording and/or reproduction device for disc-like optical information carriers, FIG. 2 a basic sketch of the light spot images on the photo-detector FIG. 3 a basic sketch for the connection of an off-set to a focusing control amplifier, FIG. 4 a basic sketch of the focusing control loop curves and FIG. 5 a basic sketch of the lengthening of the optical path.
Figure 2:
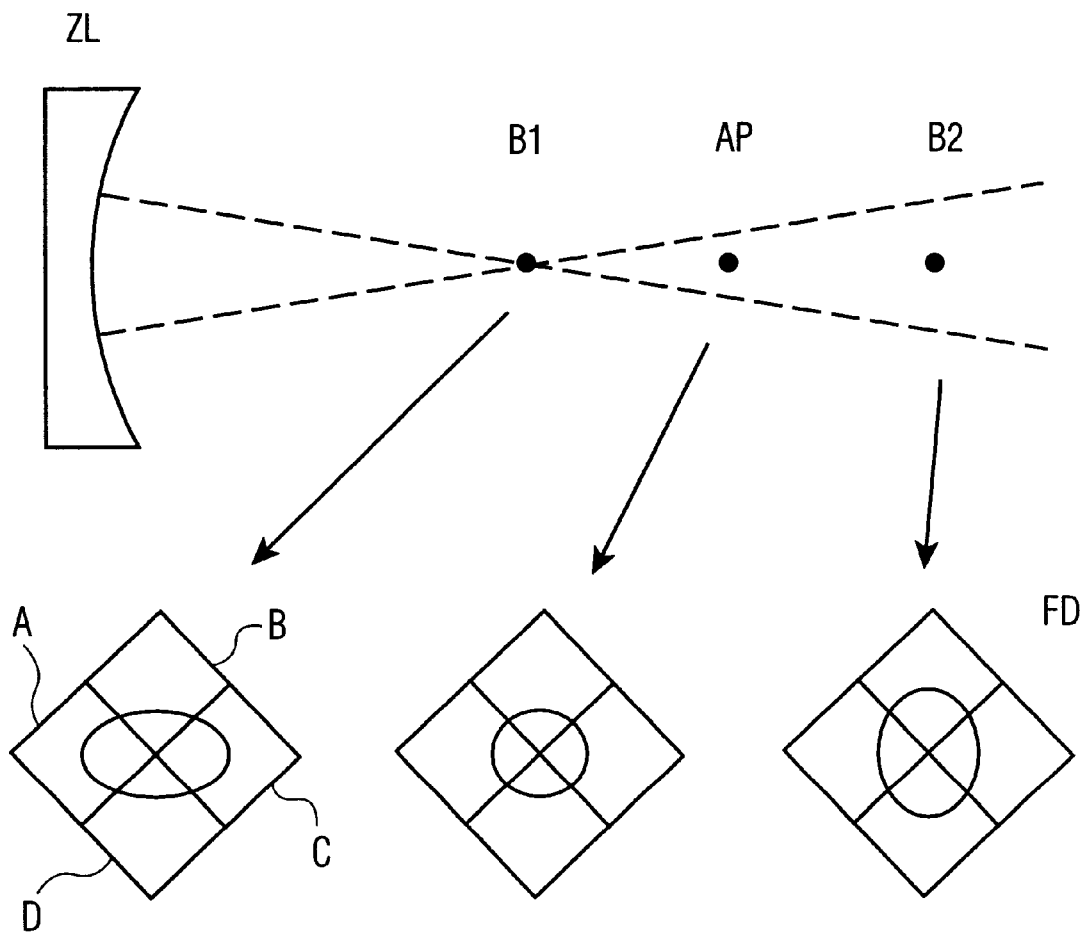

In accordance with the basic sketch of a recording and/or reproduction device for disc-like optical information carriers CD illustrated in FIG. 1, a recording and/or reproduction device contains a laser diode LD whose emitted light is focused by a beam splitter ST and an objective lens OL onto an optical information carrier CD. The light is reflected from the optical information carrier CD and reaches, once more via the objective lens OL and the beam splitter ST as well as via a cylindrical lens ZL, a photo-detector FD with which the detected optical signal is converted into one or more electrical signals. In addition to a track following signal and an information signal, signals for controlling the focusing of the scanning and/or recording beam are produced which are then supplied to a focusing control amplifier FR for forming a focusing error signal FE with which the objective lens OL is positioned, by means of a not-illustrated actuator, at a spacing from the information carrier CD which is necessary for the focusing and which is represented by the working point AP. With deviations of the objective lens from the working point AP or, a defocusing, the cylindrical lens ZL arranged in front of the photo-detector FD leads, in particular, in correspondence with FIG. 2, to a light spot formed as an image on the photo-detector FD by reflection from the information carrier CD having its shape altered in such a way that a control of the focusing is made possible. In correspondence with FIG. 2, a first focal point B1 and a second focal point B2, whose light spots form an image having a horizontal or vertical elliptical shape on the photo-detector FD consisting of four photo-segments A, B, C, D, are formed by the cylindrical lens ZL. The spacing between the cylindrical lens ZL and the photo-detector FD is constant and the location of the focal points B1, B2 is determined by the distance of the objective lens OL from the information carrier CD. The light spot imaged onto the photo-detector FD is circular at the working point AP i.e. when the light beam is focused on the information carrier CD. Upon a deviation from the circular shape i.e. a defocusing, the signals produced by the photo-segments A, B, C, D are used for controlling the focusing and the objective lens OL is again positioned in the focus position.

In order to be able to use information carriers CD of differing storage density in a single recording and/or reproduction device and to ensure, in particular, a so-called backward compatibility upon the change-over to information carriers CD having greater storage densities and the storage structures of smaller dimensions occasioned thereby, a compatible recording and/or reproduction device is proposed with which an interdependence, that is to be maintained between the dimensions of the storage structure and the light spot, is produced by purposive defocusing, and thus an enlargement associated therewith, of the light spot on the information carrier CD and the utilisation of different information carriers CD in a single device is made possible. For this, one adopts the following method: a light source is used which is adapted to the highest storage density of the information carriers CD to be used as regards wavelength and light spot dimensions and the light directed onto the information carrier CD is defocused by a defocusing means for the enlargement of the light spot for information carriers CD of lower storage density. In the manufacture of compatible recording and/or reproduction devices, a light source is used which is adapted to the highest storage density as regards wavelength and light spot dimensions i.e. the standardisation of an information carrier CD having a comparatively greater storage density is orientated, in particular, on the reduction of the dimensions of the light spot which can be achieved by shortening the wavelength of the light source or of the laser LD. Thus, for example, in order to also be able to play the hitherto conventional CD in a CD player of the new generation, an influence is effected upon the beam path in the compatible recording and/or reproduction device in such a way that a defocusing, and thus an enlargement associated therewith, of the light spot upon the information carrier CD occurs. At least one further laser diode LD would otherwise have to be used.

Figure 3:
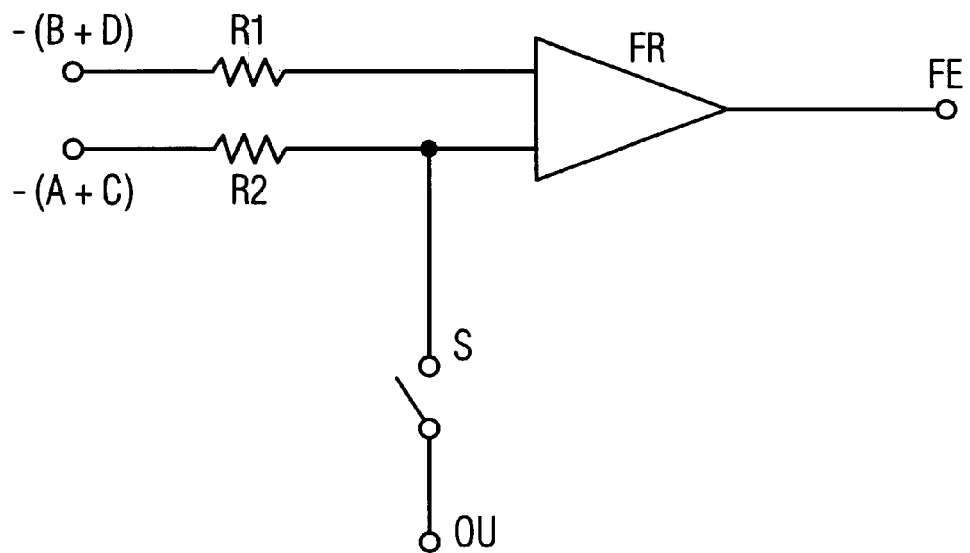
Figure 4:
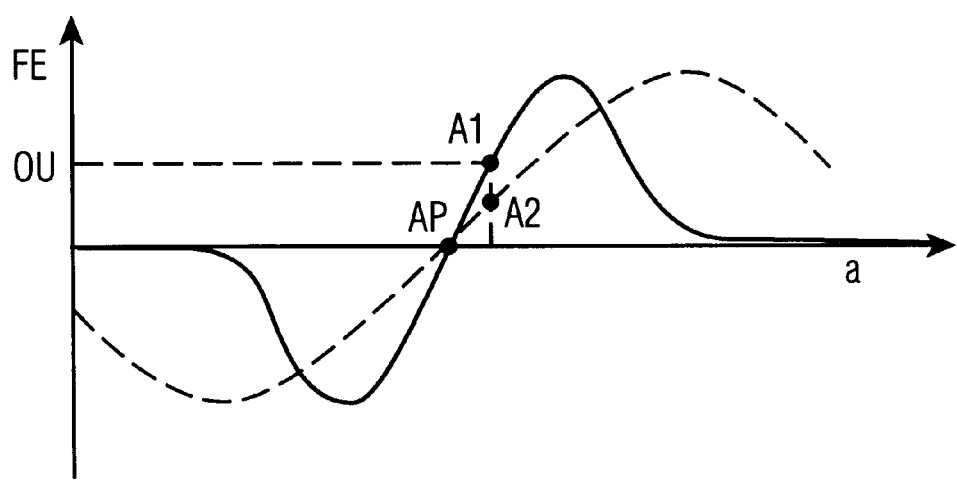
Figure 5:
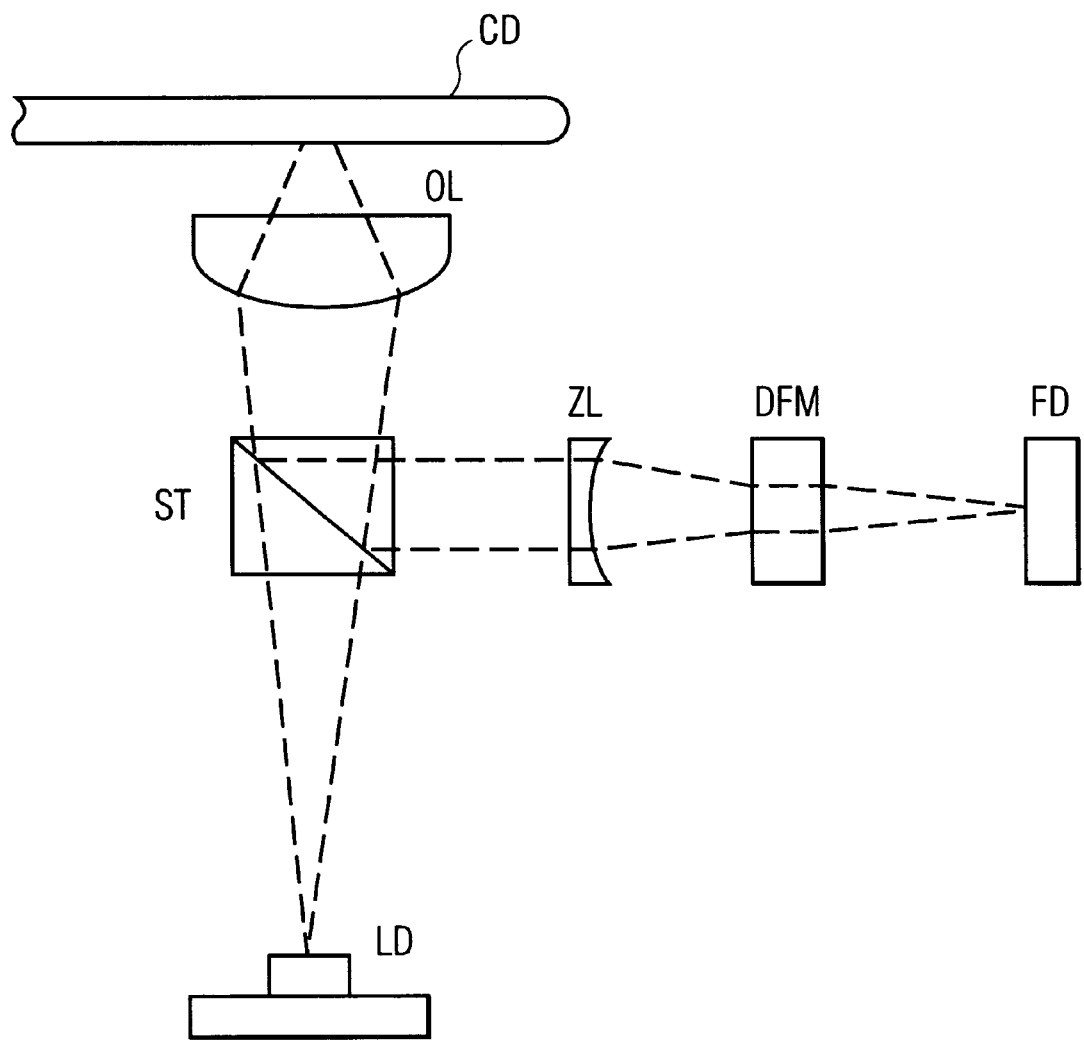

In accordance with a first embodiment illustrated in FIG. 3, the influence upon the beam path for the defocusing of the light beam directed onto the information carrier CD is effected by using an off-set voltage OU in the focusing control loop as the defocusing means for matching to the storage density of the information carrier CD. For carrying out the method, an off-set voltage source OU, which acts as a defocusing means by displacing the working point AP of the focusing control amplifier FR, is connected, in accordance with FIG. 3, via a switch S to an input of the focusing control amplifier FR which is constructed as a differential amplifier. Respective sum signals from two photo-segments A, C or B, D are supplied in known manner via a first and a second resistor R1, R2 to the focusing control amplifier FR or the differential amplifier, and the focusing error signal FE is produced by forming the difference. Due to the off-set voltage OU added to the focusing error signal FE, the objective lens OL, which is focusing the light beam, is then placed in a position which leads to an enlarged light spot on the information carrier CD. The enlarged light spot results from a displacement of the working point in the focusing control loop. The focusing control loop curve is represented as a so-called S-curve by the dashed line in FIG. 4, in the graph of the focusing error signal FE against the distance a from the objective lens OL to the information carrier CD. It is apparent, that an increase of the focusing error signal FE by the off-set voltage OU leads to a displacement of the working point AP to the working point A1 and the spacing a between the objective lens OL and the information carrier CD is increased. Due to the increased spacing a between the objective lens OL and the information carrier CD and, when maintaining the focal length of the objective lens OL, there occurs a defocusing, and thus an enlargement associated therewith, of the light spot which is then used for the scanning and/or recording of items of information with an information carrier CD of lower storage density. A one-sided restriction of the control range of the focus actuator regulating means resulting from the displacement of the working point can be compensated by appropriate dimensioning of the cylindrical lens ZL which is influencing the steepness of the S-curve. As an S-curve illustrated in FIG. 4 by broken lineation demonstrates, a one-sided restriction of the control range is diminished with an S-curve having a lower slope. The working points A1, A2 thereby correspond to an equivalent alteration of the distance a between the objective lens OL and the information carrier CD relative to the working point AP, or the distance a, effective for the focusing. In correspondence with a second embodiment, a means which lengthens the optical path length in the beam path in front of the photo-detector FD is used as the defocusing means for the manufacture of a compatible recording and/or reproduction device. In accordance with FIG. 5, this means may, for example, be a glass plate DFM arranged between the cylindrical lens ZL and the photo-detector FD. As a result of the effect of the focusing control loop, a defocusing position of the objective lens OL is reached which is likewise suitable for matching differing information storage densities. Further references in FIG. 5 are used equivalently to FIG. 1. For matching the dimensions of the light spot to the storage density of the information carrier CD, a glass plate DFM is pivoted into the beam path between the cylindrical lens ZL and the photo-detector FD for information carriers of lower storage density. The glass plate lengthens the optical path length due to the parallel transfer emanating from the glass plate DFM of the light beams incident at an angle on the glass plate DFM. Thereby, the thickness of the glass plate DFM is determined by the defocusing or the enlargement of the light spot which is required.

The application of the invention is not restricted to the embodiments specified here but is generally feasible for optical information carriers on the basis of the principle specified.

What is claimed is:

1. In a system for recording onto or reproducing information from optical information media comprising a laser providing light of a predetermined wavelength and a light spot size suitable for recording onto or reproducing information from a first optical information medium having a first information storage density, an objective lens of predetermined focal length, a photo detector for detecting reflected light from the optical information media, and a focus control circuit for controlling the position of the objective lens in response to an output of the photo detector, a method for recording onto or reproducing information from a second optical information medium having a second information storage density, the method comprising the steps of:

directing the light onto the second optical information medium;

introducing an optical length extending means into a beam path ahead of the photo detector to extend an optical path length in front of the photo detector and cause the focus control circuit to position the objective lens to thereby provide an enlarged light spot on the second optical information medium, wherein the focus control circuit controls the objective lens into a position which is sensed by the photo detector as an in focus position, which position corresponds to the enlarged spot size on the second optical information medium; and sensing a light reflected from the second optical information medium in response to the enlarged spot size and providing signals in response to the sensed light.

2. Method according to claim 1, wherein a glass plate is used as the means extending the optical path length in the beam path ahead of the photodetector.

3. Method according to claim 1, wherein a lens is used as the means extending the optical path length in the beam path ahead of the photodetector.

4. Arrangement for recording onto or reproducing information from optical information media of different information storage densities, the arrangement comprising:

a laser for providing light of a predetermined wavelength and a light spot size suitable for recording onto or reproducing information from a first optical information medium having a first information storage density;

an objective lens of predetermined focal length;

a photo detector for detecting light reflected from optical information media and providing signals in response to the detected light;

a focus control circuit coupled to said objective lens and said photo detector, said focus control circuit controlling the position of said objective lens with respect to said optical information media in response to an output of said photo detector; and an optical path length extending means for enlarging the light spot on a particular optical information medium, the optical path length extending means being introduced into a beam path ahead of the photo detector when recording onto or reproducing information from a second optical information medium having a second information storage density, wherein the optical path length extending means extends an optical path length in front of the photo detector with a result of defocusing the light spot on the second optical information medium so that the focus control circuit controls the objective lens into a position which is sensed by the photo detector as an in focus position, which position corresponds to the enlarged light spot size on the second optical information medium.

5. Arrangement according to claim 4, wherein the means extending the optical path length for defocusing and modifying the light spot size to the storage density of the information media is a glass plate arranged in the beam path ahead of the photodetector.

6. Arrangement according to claim 4, wherein the means extending the optical path length for defocusing and modifying the light spot size to the storage density of the information media is a lens arranged in the beam path ahead of the photodetector.

* * * * *